(12) United States Patent
Momoda et al.

(10) Patent No.: US 7,441,893 B2
(45) Date of Patent: Oct. 28, 2008

(54) LAYERED PRODUCT AND METHOD OF PRODUCING THE SAME

(75) Inventors: Junji Momoda, Shunan (JP); Shinobu Izumi, Shunan (JP); Naoto Takahashi, Shunan (JP)

(73) Assignee: Tokuyama Corporation, Yamaguchi (JP)

( * ) Notice: Subject to any disclaimer, the term of this patent is extended or adjusted under 35 U.S.C. 154(b) by 90 days.

(21) Appl. No.: 10/588,378

(22) PCT Filed: Feb. 2, 2005

(86) PCT No.: PCT/JP2005/001873

§ 371 (c)(1),
(2), (4) Date: Jan. 18, 2007

(87) PCT Pub. No.: WO2005/075193

PCT Pub. Date: Aug. 18, 2005

(65) Prior Publication Data

US 2007/0127133 A1 Jun. 7, 2007

(30) Foreign Application Priority Data

Feb. 3, 2004 (JP) ............... 2004-027157
Sep. 13, 2004 (JP) ............... 2004-265424

(51) Int. Cl.
*G02C 7/10* (2006.01)
*G02F 1/00* (2006.01)
*B32B 9/04* (2006.01)

(52) U.S. Cl. .............. 351/163; 359/241; 428/411.1
(58) Field of Classification Search ......... 351/163–166; 359/241–279; 428/411.1–442
See application file for complete search history.

(56) References Cited

U.S. PATENT DOCUMENTS

| | | | |
|---|---|---|---|
| 4,913,544 A | 4/1990 | Rickwood | |
| 5,694,240 A * | 12/1997 | Sternbergh | 359/359 |
| 5,739,243 A | 4/1998 | Herold et al. | |
| 6,113,813 A * | 9/2000 | Goudjil | 252/586 |
| 6,340,765 B1 | 1/2002 | Momoda et al. | |
| 6,525,194 B1 | 2/2003 | Momoda et al. | |
| 6,547,390 B1 | 4/2003 | Bernheim et al. | |
| 7,189,456 B2 * | 3/2007 | King | 428/412 |

FOREIGN PATENT DOCUMENTS

| | | |
|---|---|---|
| JP | 62-288830 A | 12/1987 |
| JP | 11-35326 A | 5/1989 |
| JP | 2-28154 A | 1/1990 |
| JP | 10-265241 A | 3/1990 |
| JP | 8-48940 A | 2/1996 |
| JP | 08-076150 A | 3/1996 |
| JP | 9-241263 A | 9/1997 |
| JP | 10-316453 A | 12/1998 |
| JP | 11-133204 A | 5/1999 |
| JP | 2002-523267 A | 7/2002 |
| WO | WO 94/22850 A1 | 10/1994 |
| WO | WO 96/14596 A1 | 5/1996 |
| WO | WO 01/05854 A1 | 1/2001 |
| WO | WO 01/60811 A1 | 8/2001 |
| WO | WO 03/011967 A1 | 2/2003 |

* cited by examiner

*Primary Examiner*—Darryl J Collins
(74) *Attorney, Agent, or Firm*—Birch, Stewart, Kolasch & Birch, LLP

(57) ABSTRACT

A layered product comprising an optical substrate having, on at least one surface thereof, a photochromic surface layer constituted by a resin in which a photochromic compound is dispersed, and an ultraviolet ray-absorbing film of a thickness of 0.1 to 100 μm formed on the photochromic surface layer of the optical substrate, the ultraviolet ray-absorbing film having a transmission factor of not smaller than 50% for a ray of light of 360 nm and a transmission factor of not larger than 10% for a ray of light of 320 nm. The layered product features a very high photochromic light resistance without causing a drop in the color density while effectively preventing the oxidation and deterioration of the photochromic compound.

10 Claims, No Drawings

LAYERED PRODUCT AND METHOD OF PRODUCING THE SAME

TECHNICAL FIELD

The present invention relates to a layered product (laminated body) which is suited as an optical article having photochromic properties like photochromic spectacle lenses.

BACKGROUND ART

Photochromism is a reversible action of a compound which quickly changes its color when it is irradiated with light containing ultraviolet rays such as sunlight or light of a mercury lamp and resumes its initial color when it is no longer irradiated with light but is placed in a dark place, and has been applied in a variety of uses.

Photochromism has been applied in a field of, for example, spectacle lenses, too, and there have been obtained plastic lenses imparted with photochromic properties by adding a variety of photochromic compounds having the above-mentioned properties. As the photochromic compounds, there have been known fulgimide compounds, spirooxazine compounds and chromene compounds.

Plastic lenses having photochromic properties are obtained by:

(i) a method of having the surfaces of a lens without photochromic properties imbibed with a photochromic compound (imbibition method);

(ii) a method of dissolving a photochromic compound in a monomer which is, then, polymerized to directly obtain a photochromic lens (in mass method); and (iii) a method of forming a coating having photochromic properties on the surfaces of the lens (coating method).

Photochromic properties of the photochromic plastic lenses produced by these methods are intimately related to the properties of the resin (or the starting monomer composition) that becomes a matrix of the photochromic compound, and a variety of studies have heretofore been conducted in an effort to improve the photochromic properties by utilizing the above properties. For example, it has been succeeded in obtaining photochromic lenses having relatively good photochromic properties such as a color density and a fading rate by employing such means as lowering the glass transition temperature (Tg) of a base lens material enabling the photochromic molecules to easily move even in the high molecules, or by using a particular alkylene glycol dimethacrylate of a long chain and a polyfunctional methacrylate having three or more radically polymerizing groups in combination as starting monomers of the matrix resin to expand free spaces in the high molecules enabling the photochromic molecules to easily move (see prior art 1 appearing below).

However, the photochromic plastic lenses involve a problem concerning the light resistance caused by the deterioration due to photo oxidation of the photochromic compound though the degree of difference may differ depending upon the method of production or the kind of the matrix resin that is used. According to the method taught in the prior art 1, for example, Tg of the base lens material is lowered to increase imbibition of the photochromic compound. Therefore, flexibility of the lens material becomes too high and, as a result, oxygen permeability becomes high and the photochromic compound is easily deteriorated by photo oxidation Therefore, if the photochromic lens obtained by this method is used for extended periods of time, the base lens material tends to be colored in yellow prior to developing color or the color density decreases. Deterioration of the photochromic compound can be prevented to a considerable degree by contriving the monomers and the photochromic material for obtaining a plastic lens that serves as a base material (see prior art 2 appearing below) still leaving, however, room for improvement. As for the photochromic lens produced by the above coating method, the coating film containing the photochromic compound has a thickness which is as small as several tens of microns. Therefore, the light resistance becomes further smaller than those of the photochromic lenses obtained by the imbibition method and the in mass method.

In order to prevent the photochromic lens from deteriorating and to increase its light resistance, a method has been proposed to form a coating containing an organic ultraviolet-absorbing agent on the surfaces of the photochromic lens (see prior art 3 appearing below.). Here, as the ultraviolet ray-absorbing agent, there can be concretely exemplified benzophenone-type and benzotriazole-type ultraviolet ray-absorbing agents.

Prior Art 1: U.S. Pat. No. 5,739,243

Prior Art 2: Leaflet of International Laid-Open No. 01/05854

Prior Art 3: U.S. Pat. No. 6,547,390

However, when an ultraviolet ray-absorbing coating is formed on the surface of the photochromic lens by using an ultraviolet ray-absorbing agent that is concretely disclosed in the above prior art 3, the ultraviolet ray-absorbing agent absorbs even ultraviolet rays of wavelengths effective for exciting the photochromic compound arousing a problem of a decreased color density of the lens.

According to the above prior art 3, further, an organic ultraviolet ray-absorbing agent is added to a silicone coating agent (most generally used coating agent) which comprises an alkoxysilane and a silica gel, and the ultraviolet ray-absorbing coating is formed by using the above coating agent. When the above coating agent is used, however, the coating becomes cloudy due to the precipitation of an ultraviolet ray-absorbing agent at the time of curing, and the quality of the lens decreases. Even when the degree of cloudiness is small, too, the ultraviolet ray-absorbing agent bleeds out from the interior of the coating after the use for extended periods of time, and the effect gradually decreases for preventing the oxidation and deterioration of the photochromic compound and the light resistance is not improved to a sufficient degree. The problem of precipitation of the ultraviolet ray-absorbing agent at the time of curing can be improved if the ultraviolet ray-absorbing agent is added in a decreased amount. To obtain a lens without virtually any problem from the standpoint of optical properties, however, it becomes necessary to considerably decrease the amount of the ultraviolet ray-absorbing agent. After all, it becomes difficult to sufficiently suppress the oxidation and deterioration of the photochromic compound, and the light resistance is not improved to a satisfactory degree.

DISCLOSURE OF THE INVENTION

It is therefore an object of the present invention to provide a photochromic product having a high photochromic light resistance without causing a drop in the color density while effectively preventing the oxidation and deterioration of a photochromic compound, and a method of producing the same.

Another object of the present invention is to provide a photochromic product which effectively prevents cloudiness caused by the precipitation of an ultraviolet ray-absorbing agent, and effectively prevents the oxidation and deterioration of a photochromic compound caused by the ultraviolet ray-absorbing agent, and a method of producing the same.

A further object of the present invention is to provide a photochromic product having a high photochromic light resistance effectively suppressing the bleed-out of the ultraviolet ray-absorbing agent even after used for extended periods of time, and stably and effectively preventing the oxidation and deterioration of the photochromic compound caused by the ultraviolet ray-absorbing agent, and a method of producing the same.

According to the present invention, there is provided a layered product (hereinafter often referred to as photochromic layered product) comprising an optical substrate having, on at least one surface thereof, a photochromic surface layer constituted by a resin in which a photochromic compound is dispersed, and an ultraviolet ray-absorbing film of a thickness of 0.1 to 100 μm formed on the photochromic surface layer of the optical substrate, the ultraviolet ray-absorbing film having a transmission factor of not smaller than 50% for a ray of light of 360 nm and a transmission factor of not larger than 10% for a ray of light of 320 nm.

In the photochromic layered product of the present invention, it is desired that:
(1) the ultraviolet ray-absorbing film has a transmission factor of not smaller than 85% for a ray of light of 560 nm; and,
(2) the ultraviolet ray-absorbing film is a coating containing an inorganic oxide which contains titanium as an ultraviolet ray-absorbing agent.

According to the present invention, further, there is provided an optical article comprising the above photochromic layered product.

The photochromic layered product can be produced by applying, onto the photochromic surface layer of the optical substrate, a silicone coating agent that contains, as an ultraviolet ray-absorbing agent, colloidal particles of an inorganic compound which selectively absorbs an ultraviolet ray of a wavelength of 320 nm, followed by curing to form an ultraviolet ray-absorbing film of a thickness of 0.1 to 100 μm.

Further, the photochromic layered product can be produced by applying, onto the photochromic surface layer of the optical substrate, an organic coating agent containing an ultraviolet ray-absorbing agent which selectively absorbs an ultraviolet ray of a wavelength of 320 nm, followed by curing to form an ultraviolet ray-absorbing film of a thickness of 0.1 to 100 μm.

Further, the photochromic layered product can be produced by vacuum-evaporating, onto the photochromic surface layer, an ultraviolet ray-absorbing agent which selectively absorbs an ultraviolet ray of a wavelength of 320 nm to form an ultraviolet ray-absorbing film of a thickness of 0.1 to 1 μm.

The ultraviolet ray-absorbing film can be directly formed on the photochromic surface layer by any one of the above production methods, or can be formed on the photochromic surface layer via a primer layer or other functional layer which does not impair the effect of the invention.

The light ray transmission characteristics of the ultraviolet ray-absorbing film formed in the photochromic layered product can be easily confirmed by forming an ultraviolet ray-absorbing film of the same composition and of the same thickness on a quartz glass, and by measuring the light transmission factors at each of the wavelengths from which the reflection by the quartz glass is subtracted. The light ray transmission characteristics of the ultraviolet ray-absorbing film formed in the photochromic layered product can be directly measured by using the layered product; i.e., by measuring the absorption of light of a particular wavelength by the ultraviolet-absorbing film relying upon the reflection method. For example, a 5° regular reflection-measuring device is attached to a spectrophotometer to measure a reflection factor relative to aluminum, and the absorption by the ultraviolet ray-absorbing film is calculated from the relative reflection factor to find a light ray transmission factor at each of the wavelengths.

In this specification, the selective absorption of the ultraviolet ray of a wavelength of 320 nm stands for that when an absorption intensity for an ultraviolet ray of a wavelength of 320 nm is presumed to be 100%, the absorption intensity for an ultraviolet ray of a wavelength of 360 nm is not larger than 80% and, desirably, not larger than 60%. The ultraviolet ray-absorbing agent having a selective absorption for a wavelength of 320 nm is achieved in many cases when its maximum wavelength of absorption is 300 to 330 nm.

In the photochromic layered product of the present invention, the ultraviolet ray-absorbing film formed on the photochromic surface layer has a thickness of 0.1 to 100 μm and, further, has predetermined light ray transmission characteristics making it possible to improve the photochromic light resistance without deteriorating basic optical characteristics of the optical substrate. That is, the ultraviolet ray-absorbing film has a transmission factor of not larger than 10% for a ray of light of 320 nm, and is capable of effectively preventing the photochromic compound existing on the photochromic surface layer from being oxidized and deteriorated by ultraviolet rays to improve photochromic light resistance. Here, the above ultraviolet ray-absorbing film at the same time exhibits the transmission factor of not smaller than 50% for a ray of light of 360 nm. Therefore, the photochromic reaction is not impaired by the ultraviolet ray-absorbing film and, for example, a decrease in the color density is effectively avoided. Therefore, despite of the formation of the ultraviolet ray-absorbing film, the photochromic layered product of the present invention exhibits the color density of when a color is developed by the photochromic compound by the irradiation with light, that is comparable to that of when no ultraviolet ray-absorbing film is formed.

Further, the photochromic layered product of the present invention can be produced by applying, onto the photochromic surface layer, the silicone coating agent or the organic coating agent containing the ultraviolet ray-absorbing agent that selectively absorbs an ultraviolet ray of 320 nm, followed by curing, or can be produced by vacuum-evaporating the above ultraviolet ray-absorbing agent on the photochromic surface layer. By forming the ultraviolet ray-absorbing film by the above method, the ultraviolet ray-absorbing film is effectively prevented from losing its properties (prevention of oxidation) caused by cloudiness resulting from the precipitation of the ultraviolet ray-absorbing agent or caused by the bleed-out of the ultraviolet ray-absorbing agent. That is, the ultraviolet ray-absorbing agent precipitates or bleeds out when an organic ultraviolet ray-absorbing agent is added to the silicone coating agent as described above. Therefore, when the ultraviolet ray-absorbing film is formed by using the silicone coating agent to which colloidal particles of an inorganic compound such as titanium-containing inorganic oxide are added as an ultraviolet ray-absorbing agent or by using an organic coating agent to which the ultraviolet ray-absorbing agent is added (coating agent using a hydrocarbon-type polymerizable monomer as a curing component), no cloudiness stems from the precipitation of the ultraviolet ray-absorbing agent, excellent transmission factor is favorably maintained for the visible light (e.g., the transmission factor is not smaller than 85% for a ray of light of 560 nm), the ultraviolet ray-absorbing agent is effectively suppressed from bleeding out, and drop in the properties of the ultraviolet ray-absorbing film can be avoided. The ultraviolet ray-absorbing agent can similarly be prevented from being precipitated or bled out even when the ultraviolet ray-absorbing film is formed by vacuum evaporation.

In the present invention, further, the ultraviolet ray-absorbing film formed by using the silicone coating agent exhibits excellent oxygen barrier property. Therefore, the photochromic compound is very lowly oxidized and deteriorated with ultraviolet rays, which is most desirable.

The photochromic layered product of the present invention can be favorably used as photochromic optical articles such as photochromic plastic lenses.

BEST MODE FOR CARRYING OUT THE INVENTION

The photochromic layered product of the present invention is obtained by forming an ultraviolet ray-absorbing film having a predetermined thickness and predetermined light ray transmission characteristics on the photochromic surface layer which is formed on the optical substrate.

[Optical Substrate]

An optical substrate stands for a transparent plate member having a pair of front and back main surfaces. The plate member may be curved and its thickness needs not necessarily be constant. A photochromic surface layer constituted by a resin in which a photochromic compound is dispersed is formed on at least one surface of the optical substrate, and a reversible change of color due to a predetermined photochromic reaction is obtained by the presence of the photochromic surface layer. Depending upon the use, the photochromic surface layer may be formed on the whole surfaces of the transparent plate member of a predetermined shape, may be formed on one whole surface, or may be partly formed on one surface. Further, the whole optical substrate is made of a resin in which a photochromic compound is dispersed, and may be so formed that the photochromic reaction takes place not only on the surface thereof but also in the interior thereof.

As the optical substrate that can be favorably used for the photochromic layered product of the present invention, there can be exemplified a photochromic plastic lens produced by the imbibition method, in mass method or coating method, and a photochromic optical component obtained by imparting photochromic properties to a transparent substrate such as a glass in the same manner as the coating method.

As the photochromic plastic lens produced by the impregnation method, there can be preferably used the one disclosed in, for example, U.S. Pat. No. 5,739,243 (prior art 1 mentioned above).

As the photochromic plastic lens produced by the smearing method, there can be preferably used a cured body disclosed in the leaflet of International Laid-Open No. 01/05854 (prior art 2 mentioned above) The cured body is obtained by curing a curable composition which contains (A) a polymerizable monomer having an L-scale Rockwell hardness of not higher than 40, (B) a trifunctional or more highly functional polyfunctional polymerizable monomer having the L-scale Rockwell hardness of not lower than 60, (C) a bifunctional polymerizable monomer having the L-scale Rockwell hardness of not lower than 60, and a photochromic compound, and has a hardness of not lower than 60. Here, the L-scale Rockwell hardness of the above polymerizable monomers stands for the hardness of the polymer obtained by homopolymerizing the above monomers.

As the photochromic plastic lens or the photochromic optical component produced by the coating method, it is desired to use the one obtained by forming a photochromic coating (photochromic surface layer) by using a coating agent of a curable composition disclosed in the leaflet of International Laid-Open No. 03/011967. The curable composition contains a radically polymerizable monomer having a silanol group or a group that forms the silanol group upon the hydrolysis, an amine compound and a photochromic compound in particular amounts. A curable composition without blended with the amine compound, too, can be favorably used as the coating agent.

As the photochromic compound, there can be used any known photochromic compound without limitation, such as a fulgimide compound, a spirooxazine compound or a chromene compound that can be used for the curable composition for producing the optical substrate.

As the fulgimide compound, spirooxazine compound and chromene compound, there can be used those compounds that are described in, for example, JP-A-2-28154, JP-A-62-288830, WO94/22850 and WO96/14596. It is also allowable to use those photochromic compounds that are disclosed in JP-A-2001-114775, JP-A-2001-031670, JP-A-2001-011067, JP-A-2001-011066, JP-A-2000-347346, JP-A-2000-344762, JP-A-2000-344761, JP-A-2000-327676, JP-A-2000-327675, JP-A-2000-256347, JP-A-2000-229976, JP-A-2000-229975, JP-A-2000-229974, JP-A-2000-229973, JP-A-2000-229972, JP-A-2000-219687, JP-A-2000-219686, JP-A-2000-219685, JP-A-11-322739, JP-A-11-286484, JP-A-11-279171, JP-A-10-298176, JP-A-09-218301, JP-A-09-124645, JP-A-08-295690, JP-A-08-176139 and JP-A-08-157467.

Among various kinds of photochromic compounds described above, it is desired in the present invention to use the chromene compounds from the standpoint of high light resistance of the photochromic properties, good color density and good fading rate. Further, the chromene compounds are favorably used even from the standpoint of obtaining a distinguished effect for maintaining the color density upon selecting the ultraviolet ray-absorbing film of the invention.

Concrete examples of the chromene compound are those compounds disclosed in the leaflet of International Laid-Open No 01/60811, U.S. Pat. No. 6,340,765 and U.S. Pat. No. 6,525,194. Among them, the most desired chromene compounds are those represented by the following general formula (1),

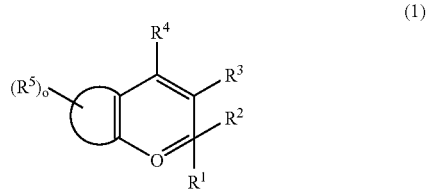

wherein the group represented by the following formula (2),

is a substituted or unsubstituted aromatic hydrocarbon group, or a substituted or unsubstituted unsaturated heterocyclic group, $R^3$, $R^4$ and $R^5$ are, independently from each other, hydrogen atoms, alkyl groups, alkoxyl groups, aralkoxy groups, amino groups, substituted amino groups, cyano groups, substituted or unsubstituted aryl groups, halogen atoms, aralkyl groups, hydroxyl groups, substituted or unsubstituted alkinyl groups, substituted or unsubstituted heterocyclic groups having a nitrogen atom as a hetero atom and in which the nitrogen atom and a pyran ring or a ring of the group represented by the above formula (2) are bonded together, o is an integer of 0 to 6, $R^1$ and $R^2$ are, independently from each other, groups represented by the following formula (3) or the following formula (4), or substituted or unsubstituted aryl groups, substituted or unsubstituted heteroaryl groups or alkyl groups, and $R^1$ and $R^2$ together may constitute an aliphatic hydrocarbon ring or an aromatic hydrocarbon ring:

 (3)

wherein $R^6$ is a substituted or unsubstituted aryl group, or a substituted or unsubstituted heteroaryl group, $R^7$ is a hydrogen atom, an alkyl group or a halogen atom, and p is an integer of 1 to 3:

 (4)

wherein $R^8$ is a substituted or unsubstituted aryl group, or a substituted or unsubstituted heteroaryl group, and p' is an integer of 1 to 3, and and wherein the substituents possessed by the substituted aryl groups or the substituted heteroaryl groups denoted by $R^1$ and $R^2$ in the above formulas (3) and (4) may be the groups same as those denoted by $R^3$ and $R^4$.

Among the chromene compounds represented by the above formula (1), the compounds represented by the following formulas (5) to (10) are particularly preferred from the standpoint of photochromic properties such as color density and fading rate, and light resistance.

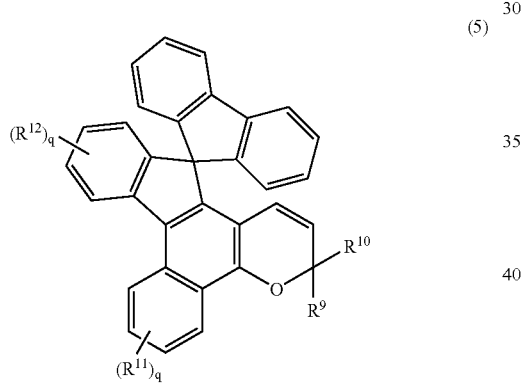 (5)

wherein $R^9$ and $R^{10}$ are as defined by $R^1$ and $R^2$ in the above formula (1), $R^{11}$ and $R^{12}$ are as defined by $R^5$ in the above formula (1), and q and q' are integers of 1 to 2.

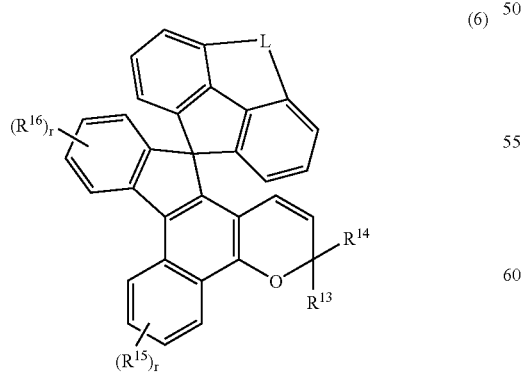 (6)

wherein $R^{13}$ and $R^{14}$ are as defined by $R^{11}$ and $R^{12}$ in the above formula (1), $R^{15}$ and $R^{16}$ are as defined by $R^5$ in the above formula (1), and L is a group represented by any one of the following formulas,

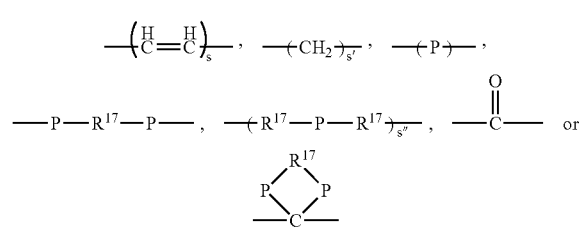

wherein P is an oxygen atom or a sulfur atom, $R^{17}$ is an alkylene group having 1 to 6 carbon atoms, and s, s' and s" are integers of 1 to 4, r and r' are, independently from each other, 1 or 2.

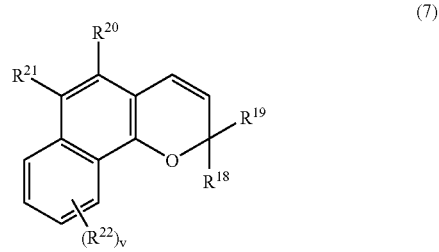 (7)

wherein $R^{18}$ and $R^{19}$ are as defined by $R^1$ and $R^2$ in the above formula (1), $R^{20}$, $R^{21}$ and $R^{22}$ are as defined by $R^5$ in the above formula (1), and v is 1 or 2.

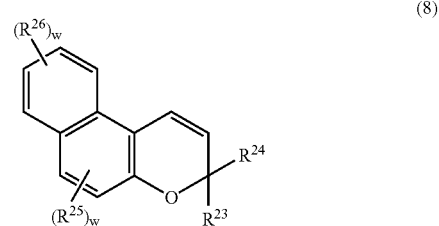 (8)

wherein $R^{23}$ and $R^{24}$ are as defined by $R^1$ and $R^2$ in the above formula (1), $R^{25}$ and $R^{26}$ are as defined by $R^5$ in the above formula (1), and w and w' are, independently from each other, 1 or 2.

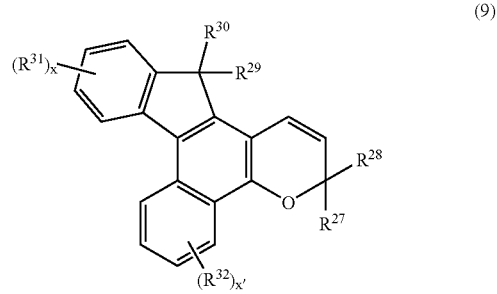 (9)

wherein $R^{27}$ and $R^{28}$ are as defined by $R^1$ and $R^2$ in the above formula (1), $R^{29}$, $R^{30}$, $R^{31}$ and $R^{32}$ are defined by $R^5$ in the above formula (1), and x and x' are, independently from each other, 1 or 2.

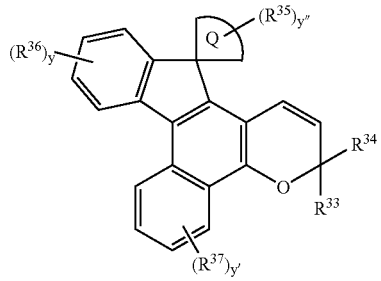
(10)

wherein $R^{33}$ and $R^{34}$ are as defined by $R^1$ and $R^2$ in the above formula (1), $R^{35}$, $R^{36}$ and $R^{37}$ are as defined by $R^5$ in the above formula (1), a ring Q is an aliphatic hydrocarbon ring, and y, y' and y" are, independently from each other, 1 or 2.

Among the chromene compounds represented by the above formulas (5) to (10) in the present invention, the chromene compounds of the following structures are particularly preferably used.

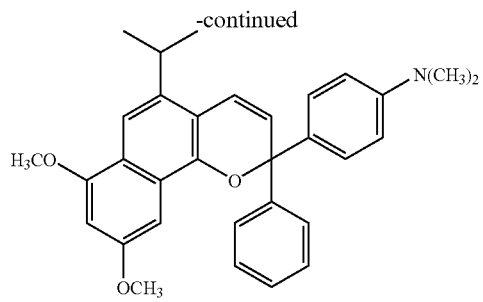

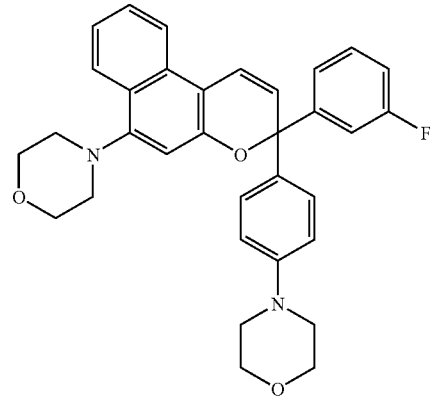

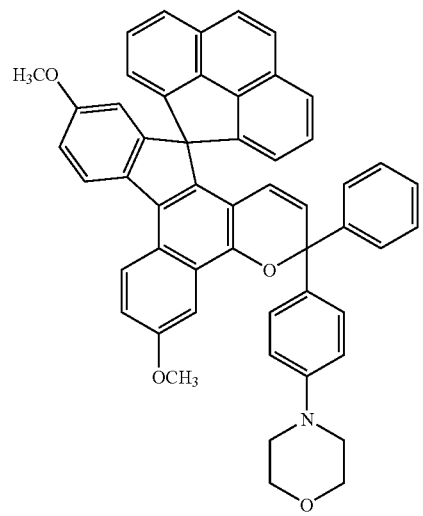

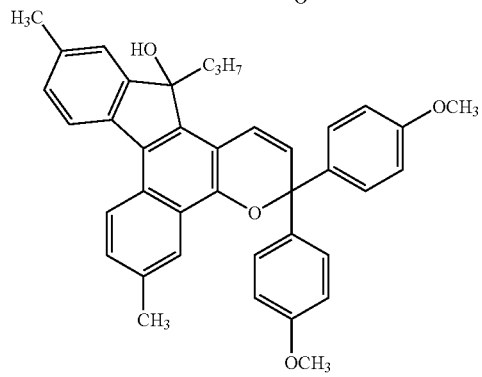

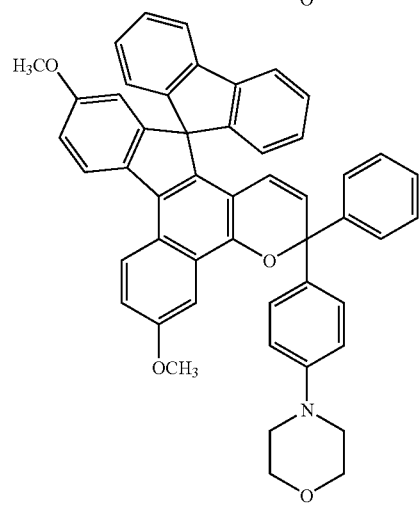

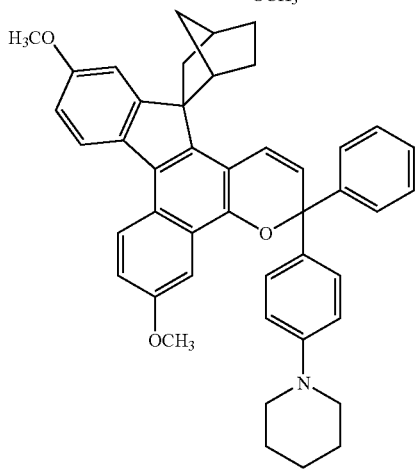

In order to develop a suitable color tone, the photochromic compounds may be used in a plurality of kinds being suitably mixed together.

The optical substrate used in the present invention has a photochromic surface layer formed thereon by using a resin composition in which the above-mentioned photochromic compound is dispersed. From the standpoint of obtaining a good color density, it is desired that the concentration of the photochromic compound in the resin composition is in a range of 0.002 to 20% by weight.

In the case of the optical substrate produced by the smearing method, the optical substrate as a whole is made of the above resin composition (i.e., the interior, too, has the same composition as the photochromic surface layer). When the optical substrate of the in mass type is a photochromic plastic resin having a thickness of not smaller than 2 mm, it is particularly desired that the content of the photochromic compound in the resin composition is in a range of 0.01 to 1% by weight from the standpoint of realizing a favorable color density while suppressing the initial color. In the case of the optical substrate forming the photochromic surface layer maintaining a thickness of 10 to 100 μm by the coating method or by the impregnation method, it is desired that the content of the photochromic compound in the photochromic surface layer is in a range of 0.1 to 15% by weight from the same point of view as described above. Further, when the photochromic surface layer has a thickness of 10 to 40 μm, it is particularly desired that the content of the photochromic compound in the surface layer is 0.1 to 5% by weight.

In the photochromic layered product of the present invention, it is desired that the photochromic surface layer is formed by the coating method or by the imbibition method. The oxidation and deterioration of the photochromic compound are caused by oxygen and harmful ultraviolet rays. In particular, oxygen diffuses greatly in a portion of a small thickness where the photochromic compound is dispersed, causing oxidation and deterioration. That is, the optical substrate having the photochromic surface layer formed by the coating method has its photochromic compound more oxidized and deteriorated than the optical substrate obtained by the smearing method. According to the present invention, the oxidation and deterioration of the photochromic compound are prevented by the provision of an ultraviolet ray-absorbing film having particular light ray transmission characteristics that will be described later. When the present invention is applied to the optical substrate obtained by the coating method, therefore, the photochromic compound is prevented from being oxidized and deteriorated, and the photochromic light resistance is improved offering a very great advantage.

Further, the resin in which the photochromic compound is dispersed (hereinafter called photochromic resin composition) may contain a variety of known additives to prevent yellowing, to improve moldability, to improve light resistance of the photochromic compound of when the photochromic compound is added, to improve the rate of developing color and to improve the fading rate.

A surfactant can be exemplified as an additive. The surfactant may be any one of the nonionic type, anionic type or cationic type. It is, however, desired to use the nonionic type surfactant from the standpoint of solubility in the radically polymerizable monomer that forms a resin component which serves as a matrix. Concrete examples of the nonionic surfactant that can be preferably used include sorbitan fatty acid ester, glycerin fatty acid ester, decaglycerin fatty acid ester, propylene glycol pentaerythritol fatty acid ester, polyoxyethylenesorbitan fatty acid ester, polyoxyethylenesorbit fatty acid ester, polyoxyethyleneglycerin fatty acid ester, polyethylene glycol fatty acid ester, polyoxyethylenealkyl ether, polyoxyethylenephytosterol/phytostanol, polyoxyethylene polyoxypropylenealkyl ether, polyoxyethylenealkylphenyl ether, polyoxyethylene castor oil/cured castor oil, polyoxyethylenelanolin/lanolin alcohol/bees wax derivative, polyoxyethylenealkylamine/fatty acid amide, polyoxyethylenealkylphenylformaldehyde condensate, surfactant having a single chain polyoxyethylenealkyl ether silicone chain (polyalkylsiloxane unit) as a hydrophobic group, perfluoroalkyl group-containing ester-type oligomer or perfluoroalkyl group-containing alkylene oxide adduct, and fluorine-type aliphatic polymer ester. The above surfactant may be used in a single kind or being mixed in two or more kinds. It is further desired that the content of the surfactant in the photochromic resin composition is, usually, in a range of 0.001 to 20% by weight.

As the additives, further, there can be used a variety of antioxidants such as hindered phenol antioxidant and sulfur antioxidant, various radical trapping agents such as phenol radical trapping agent, various photo stabilizers such as hindered amine photo stabilizers, and ultraviolet ray-absorbing agents such as benzotriazole compound and benzophenone compound, in one kind or in a combination of two or more kinds. These additives, too, may be contained in the photochromic resin composition in an amount of, usually, 0.001 to 20% by weight. Among these additives, the hindered amine photo stabilizer is desired from the standpoint of highly preventing the deterioration of the photochromic compound, and there can be preferably used, for example, a bis(1,2,2,6,6-pentamethyl-4-piperidyl)sebacate, and hindered amines such as Adekastab LA-52, LA-57, LA-62, LA-63, LA-67, LA-77, and LA-82 manufactured by Asahi Denka Kogyo Co. These hindered amine photo stabilizers are added in amounts in a range of 0.1 to 10% by weight and, most preferably, 1 to 10% by weight.

In addition to the above-mentioned various additives, there may be further added parting agent, coloring preventing agent, antistatic agent, fluorescent dye, dye, pigment, perfume and plasticizer to the photochromic resin composition in a range in which they do not impair the photochromic characteritics.

[Ultraviolet Ray-Absorbing Film]

In the photochromic laminate of the invention, the ultraviolet ray-absorbing film formed on the photochromic surface layer of the optical substrate must possess a thickness of 0.1 to 100 μm. When the thickness of the film is smaller than 0.1 μm, the light resistance is not improved to a sufficient degree. When the thickness thereof exceeds 100 μm, on the other hand, it becomes difficult to obtain a film maintaining a uniform thickness, and the optical characteristics of the layered product are deteriorated due to fluctuation in the thickness. Further, as will be described later, the ultraviolet ray-absorbing film is formed by the coating method or the vacuum evaporation method. In the case of the ultraviolet ray-absorbing film formed by the coating method, it is desired that the thickness thereof is in a range of 0.5 to 30 μm from the standpoint of light resistance and optical characteristics of the film. In the case of the ultraviolet ray-absorbing film formed by the vacuum evaporation method, it is desired that the thickness thereof is in a range of 0.1 to 1 μm.

It is further important that the ultraviolet ray-absorbing film has a transmission factor for a ray of light of 360 nm of not smaller than 50%, preferably, not smaller than 55% and, most preferably, not smaller than 60% and, at the same time, has a transmission factor for a ray of light of 320 nm of not larger than 10%, preferably, not larger than 5% and, most preferably, not larger than 3%. That is, the photochromic compound is strongly oxidized and deteriorated by light of short wavelengths which are near 320 nm and is favorably excited by light of wavelengths which are near 360 nm. Upon providing the ultraviolet ray-absorbing film having the above light ray transmission characteristics, therefore, the color density is prevented from decreasing, the photochromic compound is effectively prevented from being oxidized and deteriorated, and, hence, the photochromic light resistance can be improved. For example, when the ultraviolet ray-absorbing film has the light ray transmission factor which is lower than the above range at 360 nm, the photochromic compound exhibits a decreased color density. When the light ray transmission factor is higher than the above range at 320 nm, on the other hand, the photochromic compound cannot be effectively suppressed from being oxidized and deteriorated, and the photochromic light resistance is not improved to a sufficient degree. Namely, in the present invention, since the ultraviolet ray-absorbing film possesses the above-mentioned light ray transmission characteristics, it is made possible to improve both the light resistance and the color density of the photochromic compound.

It is further desired that the ultraviolet ray-absorbing film does not contain opaque foreign matter (e.g., precipitates of the ultraviolet ray-absorbing agent) that can be confirmed by eyes, and has excellent transparency. Therefore, though the preferred range may differ due to the reflection by the interface of the films and due to the refractive index of the film, it is, generally, desired that the ultraviolet ray-absorbing film has a transmission factor of not smaller than 85% and, more desirably, not smaller than 90% for the ray of light of 560 nm.

[Forming the Ultraviolet Ray-Absorbing Film]

The above-mentioned photochromic layered product is produced by using an ultraviolet ray-absorbing agent that selectively absorbs an ultraviolet ray of a wavelength of 320 nm, by selecting the film thickness depending upon the amount of the ultraviolet ray-absorbing agent so as to exhibit predetermined light ray characteristics within the above-mentioned range of film thickness, and by forming an ultraviolet ray-absorbing film on the photochromic surface layer of the optical substrate. As a method of forming the ultraviolet ray-absorbing film employed for the above production method, there are preferably employed (a) a coating method by using a silicone coating agent containing the ultraviolet ray-absorbing agent, (b) a coating method by using an organic coating agent containing the ultraviolet ray-absorbing agent, and (c) a method of vacuum-evaporating the ultraviolet ray-absorbing agent from the standpoint of obtaining a film having a transmission factor of not lower than 85% for the ray of light of 560 nm without precipitating the ultraviolet ray-absorbing agent and without even bleeding out the ultraviolet ray-absorbing agent.

Coating Method (a):

According to this method, the silicone coating agent containing the ultraviolet ray-absorbing agent is applied onto the photochromic surface layer, and the applied film is cured to form the ultraviolet ray-absorbing film.

As the ultraviolet ray-absorbing agent, there are used colloidal particles of an inorganic compound that selectively absorbs an ultraviolet ray of a wavelength of 320 nm. As the above inorganic compounds, there can be exemplified metal oxides such as zinc oxide, cerium oxide, zirconium oxide, iron oxide and titanium oxide, as well as composite oxides including these metal oxides. Among them, it is desired to use zinc oxide, titanium oxide, cerium oxide and composite oxides including these metal oxides and, most desirably, to use composite metal oxides including titanium oxide from the standpoint of having no color. Concretely speaking, a composite metal oxide of titanium oxide/zirconium oxide/tin oxide and a composite metal oxide of titanium oxide/zirconium oxide/silicon oxide are most desired. It is desired that the composite metal oxide contains the metal oxide that selectively absorbs the above wavelength of 320 nm in an amount of not smaller than 30% by weight and, more preferably, not smaller than 50% and, particularly, contains titanium oxide in an amount greater than the above amount. The colloidal particles of the metal oxide or the composite oxide can be prepared by the so-called sol-gel method. Besides, the sol containing such colloidal particles is available industrially or as a reagent.

The colloidal particles of the above inorganic compound may contain other inorganic compound components in small amounts so far as they are capable of selectively absorbing an ultraviolet ray of a wavelength of 320 nm.

The content of the ultraviolet ray-absorbing agent in the silicone coating agent is suitably determined so that the obtained ultraviolet ray-absorbing film possesses a light ray transmission factor at 360 nm and a light ray transmission factor at 320 nm that lie within the above-mentioned ranges. Generally, however, the ultraviolet ray-absorbing agent is contained in the ultraviolet ray-absorbing film in an amount of 15 to 90% by weight and, more preferably, 15 to 70% by weight. Further, when the ultraviolet ray-absorbing agent is used as a metal oxide, its content is most desirably 15 to 50% by weight. When the ultraviolet ray-absorbing agent is used as a composite oxide including these metal oxides, its content is most desirably 25 to 70% by weight.

The thickness of the ultraviolet ray-absorbing film is set to lie in the above-mentioned range (0.1 to 100 μm). Within this range, it is desired that the film thickness is adjusted depending upon the amount of the ultraviolet ray-absorbing agent. When the amount of the ultraviolet ray-absorbing agent is small, the thickness is increased. When the amount of the ultraviolet ray-absorbing agent is large, the thickness is decreased. This is because if the film thickness is too great as compared to the amount of the ultraviolet ray-absorbing agent in the film, the ultraviolet ray-absorbing film may crack. When, for example, the amount (concentration) of the ultraviolet ray-absorbing agent in the ultraviolet ray-absorbing film is 15 to 70% by weight, it is desired that the film thickness is in a range of 0.5 to 30 μm and, more desirably, 1 to 10 μm.

Further, the silicone coating agent used in the above method (a) contains, as a curing component, an organic silicon compound that can be hydrolyzed or a hydrolyzed product thereof. As the organosilicon compound that can be hydrolyzed or as the hydrolyzed product thereof, there can be preferably used the one that is usually used as a silane coupling agent. Concrete examples of the organosilicon compound may include γ-methacryloyloxypropyltrimethoxysilane, γ-methacryloyloxypropyltriethoxysilane, vinyltrialkoxysilane, allyltrialkoxysilane, γ-glycidoxypropyltrialkoxysilane, β-(3,4-epoxycyclohexyl)ethyltrialkoxysilane, γ-aminopropyltrialkoxysilane, tetramethoxysilane, tetraethoxysilane, tetrapropoxysilane, and tetraacetoxysilane. The curing component comprising the organosilicon compound or the hydrolyzed product thereof is contained in the ultraviolet ray-absorbing film (curing film) in an amount of 10 to 25% by weight.

The above silicone coating agent may contain other additives (e.g., acid, leveling agent, curing catalyst) and an organic solvent in addition to the above-mentioned ultraviolet ray-absorbing agent.

The acid is for promoting the hydrolysis and condensation of the organosilicon compound, and a mineral acid such as hydrochloric acid is preferably used. The above acid is used, usually, in an amount of 1 to 10 millimols per a mol of the organosilicon compound.

The organic solvent is used for improving the applicability by adjusting the viscosity of the coating agent or is used as a dispersant (sol) for the colloidal particles, and there can be preferably used methanol, isopropanol, t-butylalcohol, diacetone alcohol, ethylene glycol monoisopropyl ether, or dioxane. The organic solvent is contained in the coating agent, usually, in an amount of 40 to 90% by weight.

As the leveling agent, there can be exemplified sorbitan fatty acid ester, glycerin fatty acid ester, decaglycerin fatty acid ester, propylene glycol pentaerythritol fatty acid ester, polyoxyethylenesorbitan fatty acid ester, polyoxyethylenesorbit fatty acid ester, polyoxyethyleneqlycerin fatty acid ester, polyethyleneglycol fatty acid ester, and polyoxyethylenealkyl ether. The content of the leveling agent is about 0.01 to 3% by mass per the coating agent.

As the curing catalyst, further, there can be preferably used perchloric acids such as perchloric acid, ammonium perchlorate and magnesium perchlorate; acetyl acetonatos having Cu(II), Zn(II), Co(II), Ni(II), Be(II), Ce(III), Ta(III), Ti(III), Mn(III), La(III), Cr(III), V(III), Co(III), Fe(III), Al(III), Ce(IV), Zr(IV) and V(IV) as center atoms; amino acids such as amine and glycin, Lewis acid; and organometal salts. These curing catalysts are added to the coating agent in an amount of 0.1 to 3% by weight per the solid component.

The silicone coating agent may contain, as a reinforcing agent, colloidal particles of an inorganic oxide such as colloidal silica in a range in which they do not impair the light ray transmission characteristics of the obtained ultraviolet ray-absorbing film.

Coating Method (b):

According to this method, the ultraviolet ray-absorbing film is formed by applying an organic coating agent containing the ultraviolet ray-absorbing agent.

The ultraviolet ray-absorbing agent contained in this organic coating agent, too, selectively absorbs an ultraviolet ray of a wavelength of 320 nm. It is allowable to use an inorganic ultraviolet ray-absorbing agent such as an inorganic compound (particularly, an inorganic oxide) used in the above-mentioned method (a) and to use an organic ultraviolet ray-absorbing agent so far as they have the above light ray transmission characteristics. From the standpoint of preventing cloudiness due to the precipitation of the ultraviolet ray-absorbing agent at the time of forming the film, however, it is desired to use an organic ultraviolet ray-absorbing agent. As the organic ultraviolet ray-absorbing agent, there can be used any one or two or more of those compounds of the type of benzophenone, benzotriazole, salicylic acid ester, cyanoacrylate, hydroxybenzoate, benzooxadinone and triazine, which satisfy the condition of selectively absorbing the ultraviolet ray of a wavelength of 320 nm and are capable of forming a film having the above-mentioned light ray transmission characteristics. Among them, however, it is desired to use those compounds of the type of cyanoacrylate, salicylic acid ester and hydroxybenzoate from the standpoint of exhibiting a large maximum absorption in an ultraviolet region of a short wavelength of 320 nm and permitting a little drop in the color density of the photochromic compound. Many of the organic ultraviolet ray-absorbing agents of the type of benzotriazole or benzophenone fail to satisfy the above requirements and cannot, usually, be used alone.

As the organic ultraviolet ray-absorbing agent that can be particularly preferably used in the present invention, there can be representatively exemplified cyanoacrylate-type ultraviolet ray-absorbing agents such as ethyl-2-cyano-3,3-diphenyl acrylate, octyl-2-cyano-3,3-diphenyl acrylate and 2'-ethylhexyl-2-cyano-3,3-diphenyl acrylate; salicylic acid ester-type ultraviolet ray-absorbing agents such as phenyl salicylate and p-t-butylphenyl salicylate; and hydroxybenzoate-type ultraviolet ray-absorbing agent such as 2,4-di-t-butylphenyl-3',5'-di-t-butyl-4'-hydroxybenzoate.

The contents of these ultraviolet ray-absorbing agent, too, are adjusted in the same manner as that of the above-mentioned method (a), so that the light-transmitting characteristics (ultraviolet ray-absorbing characteristics) of the curing film satisfy the above-mentioned conditions, and are set to be, for example, in a range of 0.1 to 10% by weight and, preferably, 0.1 to 5% by weight per the solid component of the organic coating agent. The thickness of the ultraviolet ray-absorbing film is adjusted depending upon the amount of use of the ultraviolet ray-absorbing agent and is, desirably, in a range of 0.5 to 30 μm when the concentration of the ultraviolet ray-absorbing agent is, for example, 0.1 to 5% by weight.

The organic coating agent blended with the above ultraviolet ray-absorbing agent contains, as a curing component, a hydrocarbon-type polymerizable monomer that gives a transparent cured body (polymerizable monomer of which the main skeleton is formed by hydrocarbons, which may partly include oxygen atom, nitrogen atom or sulfur atom).

As the hydrocarbon-type polymerizable monomer components, there can be used, without any limitation, known polymerizable monomers and a mixture of these monomers that have been known to give transparent cured bodies, such as monofunctional or polyfunctional (meth)acrylate compound, monofunctional or polyfunctional vinyl compound, monofunctional or polyfunctional epoxy compound, polyfunctional urethane(polyisocyanate) compound, or monofunctional or polyfunctional hydroxy compound. Concrete examples of the monomer that can be preferably used are as described below.

(1) Monofunctional or Polyfunctional (Meth)Acrylate Compounds, Vinyl Compounds:

Trimethylolpropane trimethacrylate, trimethylolpropane triacrylate, tetramethylolmethane trimethacrylate, tetramethylolmethane triacrylate, trimethylolpropanetriethylene glycol triacrylate, pentaerythritol tetramethacrylate, dipentaerythritol hexaacrylate, urethaneoligomer tetraacrylate, urethane oligomer hexamethacrylate, urethane oligomer hexaacrylate, polyester oligomer hexaacrylate, diethylene glycol dimethacrylate, triethylene glycol dimethacrylate, tetraethylene glycol dimethacrylate, tripropylene glycol dimethacrylate, bisphenol A dimethacrylate, 2,2-bis(4-methacryloyloxyethoxyphenyl)propane, glycidyl methacrylate, 2,2-bis(4-acryloyloxypolyethylene glycol phenyl)propane having an average molecular weight of 776, methylether polyethylene glycol methacrylate having an average molecular weight of 475, methylstyrene, vinylnaphthalene, α-methylstyrene dimer, diallyl phthalate, and diethylene glycol bisallyl carbonate.

(2) Monofunctional or Polyfunctional Epoxy Monomers:

1,6-Hexanedioldiglycidyl ether, ethylene glycol diglycidyl ether, propylene glycol diglycidyl ether, trimethylolpropanediglycidyl ether, glycerolpolyglycidyl ether, diglycerolpolyglycidyl ether, pentaerythritoltriglycidyl ether, bisphenol A diglycidyl ether, and bis-2,2-hydroxycyclohexylpropane diglycidyl ether.

(3) Polyfunctional Urethane(Polyisocyanate) Compounds

Polyisocyanate compounds or polyisocyanate oligomer compounds obtained by bonding aromatic isocyanate compounds such as tolylene diisocyanate, 4,4-diphenylmethanediisocyanate, xylylene diisocyanate, 1,5-naphthalene diisocyanate, tolidine diisocyanate, triphenylmethane triisocyanate, tris(isocyanatephenyl)thiophosphate and tetramethylxylene diisocyanate; aliphatic isocyanate compounds such as trimethylhexamethylene diisocyanate, hexamethylene diisocyanate, isophorone diisocyanate, hydrogenated 4,4-diphenylmethane diisocyanate, hydrogenated xylylene diisocyanate, lysine diisocyanate, lysine ester truisocyanate, 1,6,11-undecanetriisocyanate, 1,8-diisocyanate-4-isocyanatemethyloctane, 1,3,6-hexamethylenetriisocyanate and bicycloheptane triisocyanate; and a compound having active hydrogen, by various methods at such feeding ratios that there remain the isocyanate groups.

(4) Monofunctional or Polyfunctional Hydroxy Compounds:

Alkylene glycols such as ethylene glycol, 1,2-propylene glycol, 1,3-butanediol, 1,4-butanediol, 1,6-hexanediol, neopentyl glycol, dipropylene glycol and diethylene glycol; polyalkylene glycols such as polypropylene glycol, polyethylene glycol and polytetramethylene glycol; poly(alkylene adipates) such as poly(diethylene adipate), poly(tetramethylene adipate), poly(hexamethylene adipate) and poly(neopentylene adipate); polycaprolactones such as poly-ε-caprolactone, polycaprolactone diol and polycaprolactone triol; polybutadiene glycols such as poly(1,4-butanediene)glycol and poly(1,2-butanediene)glycol; poly(alkylene carbonates) such as poly(hexamethylene carbonate); polyester polyols; polyols having three or more hydroxy groups, such as 1,2,4-butanetriol and 1,2,6-hexanetriol; and silicone polyols.

It is desired that the above organic coating agent contains a curing catalyst. As the curing catalyst, there can be suitably used a radical polymerization initiator or a photopolymerization initiator depending upon the reactivity of the polymerizable monomer that is used.

As the radical polymerization initiator, there can be exemplified diacyl peroxides such as benzoyl peroxide, p-chlorobenzoyl peroxide, decanoyl peroxide, lauroyl peroxide and acetyl peroxide; peroxy esters such as t-butylperoxy-2-ethyl hexanoate, t-butylperoxy dicarbonate, cumylperoxy neodecanate and t-butylperoxy benzoate; percarbonates such as diisopropylperoxy dicarbonate, di-2-ethylhexylperoxy dicarbonate and di-sec-butyloxy carbonate; and azo compounds such as 2,2'-azobisisobutylonitrile, 2,2'-azobis(4-dimethylvaleronitrile), 2,2'-azobis(2-methylbutylonitrile) and 1,1'-azobis(cyclohexane-1-carbonitrile). The amount of the radical polymerization initiator may vary depending upon the kind thereof, polymerizing conditions, and the kind and composition of the polymerizable monomer component that is used, and cannot be definitely determined but is, generally, in a range of 0.01 to 10 parts by weight per 100 parts by weight of the whole radically polymerizable monomers.

As the photopolymerization initiator, there can be exemplified benzoin, benzoinmethyl ether, benzoinbutyl ether, benzophenol, acetophenone 4,4'-dichlorobenzophenone, diethoxyacetophenone, 2-hydroxy-2-methyl-1-phenylpropane-1-one, benzylmethylketal, 1-(4-isopropylphenyl)-2-hydroxy-2-methylpropane-1-one, 1-hydroxycyclohexylphenyl ketone, 2-isopropylthioxanthone, acylphosphinoxide and diacylphosphinoxide. These photopolymerization initiators are usually used in amounts in a range of 0.001 to 5 parts by weight per 100 parts by weight of the whole radically polymerizable monomers.

As the curing catalysts other than those described above, there can be used a variety of epoxy resin curing agents and a variety of organosilicon resin curing agents. Concrete examples of the above curing agents include various organic acids and acid anhydrides thereof; nitrogen-containing organic compounds such as tertiary amine compounds; various metal complex compounds or metal alkoxides such as organotin compound and organozinc compound; and salts such as organocarboxylates and carbonates of alkali metals. The amount of addition thereof is desirably 0.1 to 5 parts by weight and, particularly, 0.5 to 2 parts by weight per a total of 100 parts by weight of the polymerizable monomers.

As required, further, the organic coating agent may contain an organic solvent for dilution or a stabilizer other than the ultraviolet ray-absorbing agent. There is no particular limitation on the organic solvent provided it dissolves monomer components and various additives, and there can be used toluene, xylene and ethyl acetate. As the stabilizer other than the ultraviolet ray-absorbing agent, there can be exemplified hindered amine photo stabilizer, hindered phenol antioxidant, sulfur-containing secondary antioxidant, phosphorus-containing secondary antioxidant and nickel-type singlet oxygen extinguishing agent.

In the above methods (a) and (b) of forming the ultraviolet ray-absorbing film by coating, there is no particular limitation on applying the coating agent onto a predetermined portion of the optical substrate, and the coating agent can be applied by spin-coating, dipping or spin-dipping. The thickness of the ultraviolet ray-absorbing film finally obtained can be controlled by adjusting the rotational speed in the spin-coating or by adjusting the viscosity of the coating agent.

Prior to applying the coating agent, the surface of the optical substrate is desirably pre-treated to improve the adhesion between the ultraviolet ray-absorbing film and the optical substrate. As the pre-treatment, there can be exemplified a chemical treatment by using a basic aqueous solution or an acidic aqueous solution, a polishing using a polishing agent, a plasma treatment using an atmospheric pressure plasma or a low pressure plasma, a corona discharge treatment and a UV ozone treatment. It is, further, desired from the standpoint of adhesion to form a primer layer by the pre-treatment and to form the ultraviolet ray-absorbing film on the primer layer. After the surface is treated as required, as described above, the primer layer is formed; i.e., any primer as represented by the urethane primer or, desirably, the urethane primer of the type that cures with moisture is applied onto the photochromic surface layer of the optical substrate and is cured. The thickness of the primer layer is, usually, about 2 to about 10 μm.

The coating layer applied onto the predetermined portion on the surface of the optical substrate is cured depending upon the kind of the coating agent to form a desired ultraviolet ray-absorbing film. When a silicone coating agent is used, for example (method (a) above), the coating layer is cured by heat-condensation to form the ultraviolet ray-absorbing film. When the organic coating agent is used (method (b) above), the coating layer is cured by heat polymerization and/or photo polymerization to form the ultraviolet ray-absorbing film When heat polymerized, the heating is effected, usually, at a temperature of 40 to 200° C. for 5 minutes to 30 hours. When photo polymerized, irradiation with light is effected maintaining a light ray intensity of 10 to 200 mW/cm$^2$ for one second to 30 minutes by using a source of light, such as a metal halide lamp, a high-pressure mercury lamp, a xenon lamp, an electrodeless discharge light source D or a V-bulb in an inert atmosphere such as of nitrogen.

When the coating agents are to be used, the coating agents may not be directly applied onto the optical substrate. Instead, an ultraviolet ray-absorbing film may be separately formed by using the coating agents and may be adhered onto a predetermined portion on the surface of the optical substrate by using an adhesive or the like.

Vacuum-Evaporation Method (c):

According to this method, the ultraviolet ray-absorbing agent is vacuum-evaporated to form the above-mentioned ultraviolet ray-absorbing film.

The ultraviolet ray-absorbing agent used in this method is an inorganic oxide which selectively absorbs the ultraviolet ray of a wavelength of 320 nm, and is a metal oxide like zinc oxide, cerium oxide, zirconium oxide, iron oxide or titanium oxide exemplified in the above-mentioned method (a), or a composite oxide including these metal oxides. The inorganic oxide that serves as the ultraviolet ray-absorbing agent is formed like a film relying on a vacuum evaporation technology such as CVD, PVD or sputtering to thereby form the ultraviolet ray-absorbing film.

In the above method, the thickness of the ultraviolet ray-absorbing film (vacuum-evaporated film) formed by vacuum evaporation is adjusted to be in a range of 0.1 to 1 μm to satisfy the above-mentioned light ray transmission characteristics. When the ultraviolet ray-absorbing film is to be formed by vacuum evaporation, it is desired that a silicone coating is formed in advance as a primer layer on the surface of the substrate to improve adhesion of the ultraviolet ray-absorbing film (vacuum-evaporated film). The primer layer has a thickness of about 2 to about 10 μm.

Among the methods (a) to (c) of the invention of forming the ultraviolet ray-absorbing film, the method (a) is advantageous from such a standpoint that the ultraviolet ray-absorbing film (cured film) that is obtained is hard and dense exhibiting high oxygen barrier property compounded by the effect of shutting off harmful ultraviolet rays near 320 nm, producing a very high effect for preventing the oxidation and deterioration of the photochromic compound, and featuring a very high effect for improving the photochromic light resistance.

The above ultraviolet ray-absorbing film is, usually, provided in a single-layer structure but may be provided in a multi-layer structure of a small number of layers provided the thickness is in the range of 0.1 to 1 μm and, preferably, 0.5 to 30 μm (0.1 to 1 μm in the case of the ultraviolet ray-absorbing film formed by vacuum evaporation). From the standpoint of easily forming the film saving labor and cost and developing little cracks that may deteriorate the appearance, the single-layer structure is most desired. Even when the multi-layer structure is employed, it is desired that the number of the layers is not greater than three. The ultraviolet ray-absorbing film having a small thickness and having a small number of layers if laminated, is distinctly different from the reflection-preventing film that is formed by subjecting the lens to the reflection-preventing treatment, i.e., is distinctly different from the film formed by alternately laminating 5 to 7 layers by vacuum-evaporating metal oxides having different refractive indexes.

The photochromic layered product of the present invention can be directly used as a photochromic optical article. Here, however, it is desired that the ultraviolet ray-absorbing film is coated with a hard coating material when the ultraviolet ray-absorbing film is not the one obtained by the above method (a). Upon being coated with the hard coating, the scratch resistance of the surface can be improved. Any known hard coating can be used without limitation, and can be formed by using a hard coating solution comprising chiefly a silane coupling agent or a sol of an oxide of zirconium, antimony or aluminum, or by using a hard coating solution comprising chiefly organic high molecules. The surface of the photochromic layered product of the invention or the surface coated with the hard coating, can be further subjected to the reflection prevention treatment by vapor-evaporating a thin film of a metal oxide such as $SiO_2$ thereon or by applying a thin film of organic high molecules thereon, or can be subjected to the working and secondary treatment such as antistatic treatment.

The photochromic layered product of the present invention can be used without limitation for the applications that develop photochromic properties upon the irradiation with light including ultraviolet rays and can preferably be used, for example, for the applications irradiated with sunlight and mercury lamp much containing harmful light of 320 nm.

EXAMPLES

Excellent effects of the invention will now be described by way of Examples and Comparative Examples to which only, however, the invention is in no way limited.

In Examples and in Comparative Examples, the optical substrates are prepared by using the following photochromic compounds.

Photochromic Compound A:
A compound having a structure represented by the following formula.

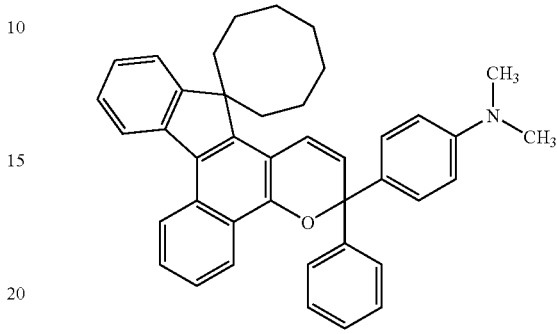

Photochromic Compound B:
A compound having a structure represented by the following formula.

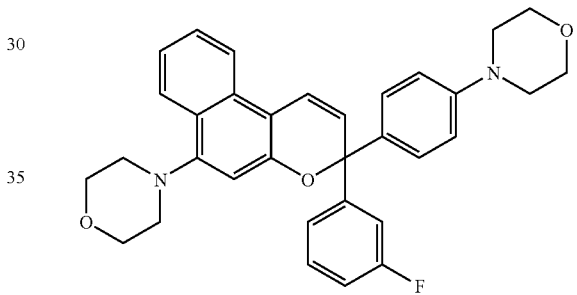

Photochromic Compound C:
A compound having a structure represented by the following formula.

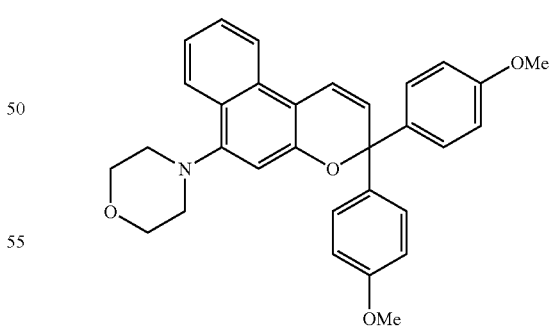

[Production of an Optical Substrate Having a Photochromic Surface Layer]

As a lens substrate, a plastic lens (refractive index=1.50) was produced by polymerizing a diethylene glycol bisallyl carbonate.

A moisture-curing primer (Primer PFR4 manufactured by Takebayashi Kagaku Kogyo Co.) and an ethyl acetate were mixed together at a weight ratio of 9:1, and were sufficiently stirred so as to become homogeneous in a nitrogen atmosphere to thereby prepare a primer coating solution. The surface of the lens substrate was sufficiently dewaxed with acetone and, thereafter, the surfaces of the lens substrate were spin-coated with the above primer coating solution by using a spin coater (Spin Coater 1H-DX2 manufactured by MIKASA), followed by curing at room temperature for 20 minutes to produce the lens substrate having a primer layer on the surfaces of the lens substrate.

Further, a mixture of radically polymerizable monomers was prepared by blending together:

| | |
|---|---|
| 2,2-Bis(4-methacryloyloxy-pentaethoxyphenyl)propane | 50 parts by weight |
| Polyethylene glycol diacrylate (average molecular weight, 532) | 15 parts by weight |
| Trimethylolpropane trimethacrylate | 15 parts by weight |
| Polyester oligomer hexaacrylate (EB-1830 manufactured by Dycel UCB Co.) | 10 parts by weight |
| Diglycidyl methacrylate | 10 parts by weight |

To 100 parts by weight of the mixture of the above radically polymerizable monomers were further added 2.35 parts by weight of the photochromic compound A, 0.2 parts by weight of the photochromic compound B and 1.6 parts by weight of the photochromic compound C followed by mixing to a sufficient degree, and to which were further added:

| | |
|---|---|
| Polymerization initiator | 0.5 parts by weight |
| Bis(1,2,2,6,6-pentamethyl-4-piperidyl)sebacate (stabilizer) | 5 parts by weight |
| γ-Methacryloyloxypropyltrimethoxysilane (silane coupling agent) | 7 parts by weight | followed by mixing to a sufficient degree to thereby prepare a photochromic polymerizable composition (photochromic coating solution). As the polymerization initiator, there was used a mixture of 1-hydroxycyclohexylphenyl ketone and bis(2,6-dimethoxybenzoyl-2,4,4-trimethyl-pentylphosphinoxide (weight ratio: 3 to 1).

Next, about 2 g of the photochromic coating solution was applied onto the surfaces of the lens substrate by using the above-mentioned spin coater, cured by the irradiation with light of 405 nm of an intensity of 120 mW/cm² by using a metal halide lamp in a nitrogen gas atmosphere for 3 minutes, and was further heat-treated in a constant-temperature device maintained at 110° C. for one hour to obtain an optical substrate (lens substrate) having a photochromic coating (photochromic surface layer). The obtained photochromic coating possessed a thickness of 40 μm

Example 1

On the photochromic coating of the optical substrate prepared as described above, an ultraviolet ray-absorbing film was formed as described below to obtain a photochromic layered product.

| | |
|---|---|
| γ-Glycidoxypropyltrialkoxysilane (GTS) | 9.15 g |
| t-Butyl alcohol (TBA) | 5.6 g |
| Diacetone alcohol (DAA) | 2.8 g |
| Leveling agent (L7001 manufactured by Nihon Unicar Co.) | 0.025 g | were mixed together, and to which 2.09 g of a 0.05 N hydrochloric acid aqueous solution was added dropwise with stirring, and the mixture was stirred for 4 hours.

To the above mixed solution were added:

| | |
|---|---|
| Aluminum acetyl acetonato (Al(AcAc)₃) | 0.094 g |
| Isopropyl alcohol (IPA) | 2.8 g |
| Ethylene glycol isopropyl ether (EGiPE) | 2.8 g | followed by stirring for 30 minutes. To this solution was added, as an ultraviolet ray-absorbing agent, 25.07 g of a fine granular sol of a methanol-dispersed titanium oxide/zirconium oxide/silicon oxide composite metal oxide (weight ratio: 65/5/30, solid component concentration of 30% by weight). The mixture was stirred at room temperature overnight to prepare a solution containing fine oxide particles (ultraviolet ray-absorbing agent). The solution was, thereafter, filtered through a filter of 0.5 microns to prepare a silicone coating agent containing the ultraviolet ray-absorbing agent. The composition of the silicone coating agent was as shown in Table 1.

4 Grams of the thus prepared silicone coating agent was applied onto the photochromic coating of the optical substrate prepared above by using the same spin coater as the one described above. The spin-coating conditions were 650 rpm for 15 seconds.

The silicone coating agent after spin-coated was pre-dried at 70° C. for 15 minutes and was, then, cured at 120° C. for one hour to obtain a photochromic layered product having an ultraviolet ray-absorbing film of a thickness of 2 μm.

The photochromic layered product was evaluated for its ultraviolet ray-absorption characteristics and photochromic characteristics by methods described below.

Evaluation of Ultraviolet Ray-Absorption Characteristics:

The silicone coating agent containing the ultraviolet ray-absorbing agent used above was applied onto a quartz glass by the spin-coating under quite the same conditions as those described above and was cured to form a cured film (ultraviolet ray-absorbing film) having the same thickness. The cured film was measured for its light ray transmission factors at 320 nm, 360 nm and 560 nm to evaluate the ultraviolet ray-absorption characteristics of the ultraviolet ray-absorption film in the photochromic layered product. The light ray transmission factor at 560 nm was 90% and the film was clear without cloudiness as viewed by eyes. Further, the light ray transmission factor was 74% at 360 nm and was 1% at 320 nm. The results were as shown in Table 2.

Evaluation of Photochromic Characteristics:

The photochromic characteristics of the obtained photochromic layered product were evaluated by measuring the color density, light resistance and yellowness by methods described below. The results were as shown in Table 3.

(1) Color Density $A_0$ (Abs.)

The obtained photochromic layered product was irradiated with light by using a xenon lamp L-2480 (300 W) SHL-100 manufactured by Hamamatsu Photonics Co. via an aeromass filter (manufactured by Coning Co.) at 20° C.±1° C. for 120 seconds to develop color.

The beam intensities on the surface of the laminate were 365 nm=2.4 mW/cm² and 245 nm=24 μW/cm². The absorbency at a maximum absorption wavelength was found by using a spectrophotometer (rapid multi-channel photo detector MCPD 1000) manufactured by Otsuka Denshi Kogyo Co., and the color density was calculated according to the following method.

A difference ($A_0=\epsilon(120)-\epsilon(0)$) was found between the absorbency [$\epsilon(120)$] at 590 nm after irradiated with light for 120 seconds and the absorbency [$\epsilon(0)$] of the cured body at the above wavelength in a state of not irradiated with light, and was regarded to be a color density. The higher this value, the more excellent the photochromic characteristics.

(2) Light Resistance:

The light resistance of color due to the irradiation with light was evaluated by the following deterioration acceleration testing.

That is, the obtained photochromic layered product was deteriorated in an accelerated manner for 50 hours by using the Xenon Weather Meter X25 manufactured by Suga Shikenki Co. The color density was measured before and after the accelerated deterioration ($A_0$: color density before the testing, $A_{50}$: color density after the testing), and a value [($A_{50}/A_0$)×100] was regarded to be a residual ratio (%) and was used as an index of light resistance of color. The higher the residual ratio, the higher the light resistance of color.

(3) Yellowness (YI):

Yellowness of the photochromic layered product of before developing color was measured before and after the above deterioration acceleration testing by using a color difference meter (SM-4) manufactured by Suga Shikenki Co. YI0 stands for the yellowness of before the acceleration testing and YI50 stands for the yellowness of after the acceleration testing. A difference in the yellowness ($\Delta YI=YI50-YI0$) was also found before and after the deterioration testing. The larger the YI value, the more intense the yellowness. The larger the $\Delta YI$ value, the greater the difference in the yellowness before and after the deterioration testing.

Examples 2 and 3

Photochromic laminated bodies were produced in the same manner as in Example 1 but changing the composition of the silicone coating agent used for forming the ultraviolet ray-absorbing film as shown in Table 1, and were evaluated for their ultraviolet ray-absorption characteristics and photochromic characteristics. The results were as shown in Tables 2 and 3.

Example 4

A photochromic layered product was produced in the same manner as in Example 1 but changing the ultraviolet ray-absorbing film as described below.

A hard coating solution (trade name: 160-74NT) manufactured by SCL International Co. was used as a coating solution for forming the ultraviolet ray-absorbing film. The coating solution was a hard coating solution containing titanium oxide, possessed a solid component concentration of about 33% by weight, and the refractive index of the hard coating was 1.60 according to the catalogue. 4 Grams of the coating solution was applied onto the photochromic coating of the optical substrate produced above by using the same spin coater as the one described above. The spin-coating conditions were 600 rpm for 10 seconds. The silicone coating agent after spin-coated was pre-dried at 70° C. for 15 minutes and was, then, cured at 120° C. for one hour to obtain a photochromic layered product. An ultraviolet ray-absorbing film obtained here possessed a thickness of 4.8 μm.

The photochromic layered product was evaluated for its ultraviolet ray-absorption characteristics and photochromic characteristics by the same method as that of Example 1. The results were as shown in Tables 2 and 3.

Example 5

A photochromic layered product was produced in the same manner as in Example 1 but forming the ultraviolet ray-absorbing film by using an organic coating agent as described below.

A mixture of radically polymerizable monomers was prepared by mixing 90 parts by weight of a 2-hydroxyethyl methacrylate and 10 parts by weight of an urethane oligomer hexaacrylate.

Next, components of the following recipe:

The above mixture of radically polymerizable monomers

| | |
|---|---|
| The above mixture of radically polymerizable monomers | 100 parts by weight |
| Ethyl-2-cyano-3,3-diphenyl 1 acrylate (cyanoacrylate type organic ultraviolet ray-absorbing agent) | 1.5 parts by weight |
| Photo polymerization initiator | 0.1 parts by weight | were mixed together to a sufficient degree to prepare an organic coating agent. As the photo polymerization initiator, there was used a mixture of a 1-hydroxycyclohexylphenyl ketone and a bis(2,6-dimethoxybenzoyl-2,4,4-trimethyl-pentylphosphinoxide (weight ratio: 3 to 1).

About 2 g of the of the above organic coating agent was applied onto the surface of the photochromic coating of the optical substrate by using the spin coater described above under quite the same conditions as those in Example 1. Next, by using a metal halide lamp, the optical substrate was irradiated with light of 405 nm of an intensity of 120 mw/cm² in a nitrogen gas atmosphere for one minute to cure the organic coating, and was further heat-treated in a constant-temperature device maintained at 110° C. for one hour to obtain a photochromic layered product having an organic ultraviolet ray-absorbing film on the surface of the photochromic coating. The obtained organic ultraviolet ray-absorbing film possessed a thickness of 10 μm.

The photochromic layered product was evaluated for its ultraviolet ray-absorption characteristics and photochromic characteristics by the same method as that of Example 1. The results were as shown in Tables 2 and 3.

Example 6

A photochromic layered product was produced in the same manner as in Example 1 but forming the ultraviolet ray-absorbing film by vacuum-evaporating a metal oxide in a manner as described below.

First, a general-purpose silicone coating agent (alkoxysilane/silica sol type: TS-56H produced by Tokuyama Co.) was applied by dipping onto the surface of the optical substrate produced above, and was cured at 120° C. for 2 hours to form a primer layer. The primer layer possessed a thickness of 1.6 μm. The coating agent was blended with no ultraviolet ray-absorbing agent, and no ultraviolet ray-absorbing agent was present in the primer layer.

Next, a thin film of titanium oxide (ultraviolet ray-absorbing film) was formed on the primer layer by the vacuum evaporation method to obtain a photochromic layered product having an ultraviolet ray-absorbing film (vacuum-evaporated film) on the surface of the photochromic coating. The vacuum-evaporated film possessed a thickness of 0.2 µm.

The photochromic layered product was evaluated for its ultraviolet ray-absorption characteristics and photochromic characteristics by the same method as that of Example 1. The results were as shown in Tables 2 and 3.

Comparative Example 1

A photochromic layered product was produced in the same manner as in Example 1 but adding a fine granular sol of a titanium oxide dispersed in methanol/zirconium oxide/silicon oxide composite metal oxide (weight ratio: 20/5/75, solid component concentration of 30% by weight) to the silicone coating agent instead of adding a sol of the ultraviolet ray-absorbing agent.

The photochromic layered product was evaluated for its ultraviolet ray-absorption characteristics and photochromic characteristics by the same method as that of Example 1. The results were as shown in Tables 2 and 3.

Comparative Example 2

Blank Testing

The optical substrate produced above was evaluated for its photochromic characteristics without laminating any layer on the surface of the photochromic coating. The results were as shown in Table 3. The ultraviolet ray-absorbing characteristics of the optical substrate were as shown in Table 2 with the light ray transmission factors as 100% at each of the wavelengths.

Comparative Example 3

The optical substrate (substrate of before forming the vacuum-evaporation film) forming the primer layer on the surface thereof produced in Example 6 was evaluated for its ultraviolet ray-absorbing characteristics and photochromic characteristics by the same method as that of Example 1. The results were as shown in Tables 2 and 3. The ultraviolet ray-absorption characteristics were those of the primer layer.

Comparative Example 4

A solution containing fine granular oxide (which is not an ultraviolet ray-absorbing agent) was prepared in quite the same manner as in Example 1 but using a fine granular sol of a methanol-dispersed silicon oxide metal oxide of an equal amount (solid component concentration of 30% by weight) instead of using the fine granular sol of the composite metal oxide To 100 parts-by weight of the above solution was further mixed 1.8 parts by weight of a 2-(5-chloro-2'-hydroxy-3'-t-butyl-5'-methylphenyl)-benzotriazole as an organic ultraviolet ray-absorbing agent with stirring until the organic ultraviolet ray-absorbing agent was dissolved. The solution was filtered through a filter of 0.5 microns to prepare a silicone coating agent containing an organic ultraviolet ray-absorbing agent.

By using the silicone coating agent, a photochromic layered product was produced having an ultraviolet ray-absorbing film of a thickness of 2 µm in quite the same manner as in Example 1. The photochromic layered product was evaluated for its ultraviolet ray-absorption characteristics and photochromic characteristics by the same method as that of Example 1. The results were as shown in Tables 2 and 3.

TABLE 1

| Components of silicone coating agent unit: g | Ex-1 | Ex-2 | Ex-3 | ComEx-1 |
| --- | --- | --- | --- | --- |
| L7001 | 0.025 | 0.025 | 0.025 | 0.025 |
| TBA | 5.6 | 6 | 3.6 | 5.6 |
| DAA | 2.8 | 3 | 1.8 | 2.8 |
| GTS | 9.15 | 12.8 | 5.5 | 9.15 |
| 0.05N—HCl | 2.09 | 2.93 | 1.26 | 2.09 |
| Composite metal oxide sol-dispersed solution (titanium oxide content in sol, 65%, solid component concentration, 30 wt %) | 25.07 | 15.04 | 35.09 | |
| Composite metal oxide sol-dispersed solution (titanium oxide content in sol, 20%, solid component concentration, 30 wt %) | | | | 25.07 |
| Al(AcAc)3 | 0.094 | 0.094 | 0.094 | 0.094 |
| IPA | 2.8 | 3 | 1.8 | 2.8 |
| EGiPE | 2.8 | 3 | 1.8 | 2.8 |
| MeOH | | 4.5 | | |

Note:
Ex; Example, ComEx; Comparative Example

Note: Ex;Example, ComEx;Comparative Example

TABLE 2

| NO. | Ultraviolet ray-absorbing agent in ultraviolet ray-absorbing film | Thickness of ultraviolet ray-absorbing film (µm) | Light transmittance (%) at 560 nm | Light transmittance (%) at 360 nm | Light transmittance (%) at 320 nm |
| --- | --- | --- | --- | --- | --- |
| Ex-1 | Titanium oxide zirconium oxide | 2 | 90 | 74 | 1 |
| Ex-2 | Titanium oxide zirconium oxide | 2 | 90 | 82 | 5 |
| Ex-3 | Titanium oxide zirconium oxide | 2 | 90 | 65 | 0 |
| Ex-4 | Titanium oxide | 4.8 | 90 | 80 | 2 |
| Ex-5 | Cyanoacrylate organic ultraviolet ray absorber | 10 | 92 | 78 | 3 |
| Ex-6 | Titanium oxide | 0.2 | 89 | 64 | 0 |
| ComEx-1 | Titanium oxide zirconium oxide | 2 | 90 | 86 | 35 |
| ComEx-2 | None | — | 100 | 100 | 100 |
| ComEx-3 | None | — | 92 | 92 | 92 |

TABLE 2-continued

| NO. | Ultraviolet ray-absorbing agent in ultraviolet ray-absorbing film | Thickness of ultraviolet ray-absorbing film (μm) | Light transmittance (%) at 560 nm | Light transmittance (%) at 360 nm | Light transmittance (%) at 320 nm |
|---|---|---|---|---|---|
| ComEx-4 | Benzotriazole organic ultraviolet ray absorber | 2 | 80 | 12 | 12 |

TABLE 3

| | Fadometer irradiation time (hr) | | | | | |
|---|---|---|---|---|---|---|
| | 0 | | 50 | | | Residual |
| No. | YI0 | A0 | YI50 | ΔYI | A50 | ratio (%) |
| Ex-1 | 5.5 | 0.73 | 10.8 | 5.3 | 0.67 | 92 |
| Ex-2 | 5.7 | 0.75 | 12.2 | 6.5 | 0.69 | 92 |
| Ex-3 | 5.7 | 0.7 | 10.3 | 4.6 | 0.66 | 94 |
| Ex-4 | 6.0 | 0.80 | 8.2 | 2.2 | 0.70 | 88 |
| Ex-5 | 5.5 | 0.80 | 12 | 6.5 | 0.69 | 86 |
| Ex-6 | 6.2 | 0.75 | 9.0 | 2.8 | 0.69 | 92 |
| Com Ex-1 | 6.1 | 0.73 | 13.9 | 7.8 | 0.59 | 81 |
| Com Ex-2 | 3.4 | 0.88 | 13.6 | 10.2 | 0.64 | 73 |
| Com Ex-3 | 4.5 | 0.85 | 14.0 | 9.5 | 0.64 | 75 |
| Com Ex-4 | 8.0 | 0.25 | 20.2 | 12.2 | 0.12 | 46 |

The invention claimed is:

1. A layered product comprising an optical substrate having, on at least one surface thereof, a photochromic surface layer constituted by a resin in which a photochromic compound is dispersed, and an ultraviolet ray-absorbing film of a thickness of 0.1 to 100 μm formed on the photochromic surface layer of said optical substrate, said ultraviolet ray-absorbing film having a transmission factor of not smaller than 50% for a ray of light of 360 nm and a transmission factor of not larger than 10% for a ray of light of 320 nm.

2. The layered product according to claim 1, wherein said ultraviolet ray-absorbing film has a transmission factor of not smaller than 85% for a ray of light of 560 nm.

3. The layered product according to claim 1, wherein said ultraviolet ray-absorbing film is a coating containing an inorganic oxide which contains titanium as an ultraviolet ray-absorbing agent.

4. An optical article comprising the layered product of claim 1.

5. A method of producing the layered product of claim 1, which comprises steps of:
   providing an optical substrate having, on at least one surface thereof, a photochromic surface layer constituted by a resin in which a photochromic compound is dispersed;
   applying, onto the photochromic surface layer of said optical substrate, a silicone coating agent that contains, as an ultraviolet ray-absorbing agent, colloidal particles of an inorganic compound which selectively absorbs an ultraviolet ray of a wavelength of 320 nm, and
   curing the silicone coating agent to form an ultraviolet ray-absorbing film of a thickness of 0.1 to 100 μm.

6. The production method according to claim 5, wherein said silicone coating agent is applied onto the photochromic surface layer directly or via a primer layer.

7. The method of producing the layered product of claim 1, which comprises steps of:
   providing an optical substrate having, on at least one surface thereof, a photochromic surface layer constituted by a resin in which a photochromic compound is dispersed;
   applying, onto the photochromic surface layer of said optical substrate, an organic coating agent containing an ultraviolet ray-absorbing agent which selectively absorbs an ultraviolet ray of a wavelength of 320 nm, and
   curing the organic coating agent to form an ultraviolet ray-absorbing film of a thickness of 0.1 to 100 μm.

8. The production method according to claim 7, wherein said organic coating agent is applied onto the photochromic surface layer directly or via a primer layer.

9. The method of producing the layered product of claim 1, which comprises steps of:
   providing an optical substrate having, on at least one surface thereof, a photochromic surface layer constituted by a resin in which a photochromic compound is dispersed; and
   vacuum-evaporating, onto the photochromic surface layer, an ultraviolet ray-absorbing agent which selectively absorbs an ultraviolet ray of a wavelength of 320 nm to form an ultraviolet ray-absorbing film of a thickness of 0.1 to 1 μm.

10. The production method according to claim 9, wherein said ultraviolet ray-absorbing agent is applied onto the photochromic surface layer directly or via a primer layer.

* * * * *